US010643541B2

(12) United States Patent
Xuan et al.

(10) Patent No.: US 10,643,541 B2
(45) Date of Patent: May 5, 2020

(54) DRIVING CIRCUIT OF DISPLAY PANEL, DISPLAY PANEL AND DISPLAY DEVICE

(71) Applicant: BOE TECHNOLOGY GROUP CO., LTD., Beijing (CN)

(72) Inventors: Minghua Xuan, Beijing (CN); Shengji Yang, Beijing (CN); Li Xiao, Beijing (CN); Dongni Liu, Beijing (CN); Jie Fu, Beijing (CN); Pengcheng Lu, Beijing (CN); Xiaochuan Chen, Beijing (CN); Lei Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 35 days.

(21) Appl. No.: 16/090,700

(22) PCT Filed: Mar. 6, 2018

(86) PCT No.: PCT/CN2018/078168
§ 371 (c)(1),
(2) Date: Oct. 2, 2018

(87) PCT Pub. No.: WO2018/205726
PCT Pub. Date: Nov. 15, 2018

(65) Prior Publication Data

US 2019/0385529 A1 Dec. 19, 2019

(30) Foreign Application Priority Data

May 12, 2017 (CN) .......................... 2017 1 0338694

(51) Int. Cl.
*G06F 3/038* (2013.01)
*G09G 5/00* (2006.01)
*G09G 3/3258* (2016.01)

(52) U.S. Cl.
CPC ... *G09G 3/3258* (2013.01); *G09G 2310/0286* (2013.01); *G09G 2330/021* (2013.01)

(58) Field of Classification Search
CPC ..... G09G 2310/0286; G09G 2330/021; G09G 3/3225; G09G 3/3258; G09G 3/3266
See application file for complete search history.

(56) References Cited

U.S. PATENT DOCUMENTS

2005/0012732 A1 1/2005 Koyama et al.
2006/0158395 A1 7/2006 Kubota et al.
(Continued)

FOREIGN PATENT DOCUMENTS

CN 1808550 A 7/2006
CN 1959789 A 5/2007
(Continued)

OTHER PUBLICATIONS

First Chinese Office Action dated Sep. 3, 2018.
Intenational Search Report and Written Opinion dated May 18, 2018.

*Primary Examiner* — Insa Sadio
(74) *Attorney, Agent, or Firm* — Dilworth & Barrese, LLP.; Michael J. Musella, Esq.

(57) ABSTRACT

The present disclosure relates to a driving circuit of a display panel, a display panel and a display device. The driving circuit includes at least one potential saving unit and at least one column of pixel driving units. The potential saving unit is arranged corresponding to a column of pixel units, and is configured to output a first potential signal based on a voltage of the external preset power supply and save the first potential signal to the first potential output terminal, while outputting a second potential signal and saving the second potential signal to the second potential output terminal.

20 Claims, 4 Drawing Sheets

(56) References Cited

U.S. PATENT DOCUMENTS

| | | | | |
|---|---|---|---|---|
| 2006/0221015 | A1 | 10/2006 | Shirasaki | |
| 2007/0096966 | A1 | 5/2007 | Kim | |
| 2009/0189848 | A1 * | 7/2009 | Maeda | G09G 3/344 345/107 |
| 2010/0309233 | A1 | 12/2010 | Choi | |
| 2011/0102410 | A1 | 5/2011 | Cho et al. | |
| 2012/0013587 | A1 * | 1/2012 | Yen | G09G 3/3688 345/211 |
| 2014/0111563 | A1 | 4/2014 | Hwang et al. | |
| 2016/0321995 | A1 | 11/2016 | Shin | |
| 2016/0379569 | A1 | 12/2016 | Lee et al. | |
| 2018/0247596 | A1 | 8/2018 | Zhao et al. | |

FOREIGN PATENT DOCUMENTS

| | | | |
|---|---|---|---|
| CN | 1989539 | A | 6/2007 |
| CN | 101369401 | A | 2/2009 |
| CN | 102054431 | A | 5/2011 |
| CN | 102714018 | A | 10/2012 |
| CN | 205282059 | U | 6/2016 |
| CN | 106097963 | A | 11/2016 |
| CN | 106920513 | A | 7/2017 |

* cited by examiner

DRIVING CIRCUIT OF DISPLAY PANEL, DISPLAY PANEL AND DISPLAY DEVICE

CROSS-REFERENCE TO RELATED APPLICATION

The application claims priority to Chinese patent application No. 201710338694.3, filed May 12, 2017, the disclosure of which is incorporated herein by reference in its entirety as part of the application.

TECHNICAL FIELD

The embodiments of the present disclosure relate to a driving circuit for a display panel, a display panel and a display device.

BACKGROUND

Currently, due to the limitations of its own light emitting diodes, an AMOLED (Active-matrix Organic Light Emitting Diode) display screen has a power consumption which has remained high in the case of displaying an all-white picture.

For example, as for the same picture, in the premise of scanning of gate voltages, the same picture may be kept displaying by inputting data voltage pulses constantly, which not only complicates the data voltage pulse, but also increases the power consumption of a whole driving circuit, thereby increasing the power consumption of a whole display screen.

SUMMARY

At least one embodiments of the present disclosure provides a driving circuit of a display panel, which includes:

at least one potential saving unit, arranged corresponding to a column of pixel units, wherein the potential saving unit includes a power supply terminal, a first potential output terminal and a second potential output terminal, the power supply terminal is connected with an external preset power supply, and the potential saving unit is configured to output a first potential signal based on a voltage of the external preset power supply and save the first potential signal to the first potential output terminal, while outputting a second potential signal and saving the second potential signal to the second potential output terminal; and at least one column of pixel driving units, including one or more pixel driving units, wherein each of the pixel driving units is connected with the first potential output terminal, the second potential output terminal, a corresponding control signal line and a corresponding pixel unit, and each of the pixel driving units drives the corresponding pixel unit based on a control signal of the corresponding control signal line, the first potential signal and the second potential signal.

According to some embodiments of the present disclosure, each of the pixel driving units includes:

a first transistor, including a first terminal connected with the first potential output terminal and a control terminal connected with the corresponding control signal line; and a second transistor, including a first terminal connected with a second terminal of the first transistor and the corresponding pixel unit, a second pole connected with the second potential output terminal, and a control terminal connected with the corresponding control signal line via an inverter.

According to some embodiments of the present disclosure, the driving circuit further includes: at least one shifting register, and a third transistor and a fourth transistor connected with the shifting register, wherein a control terminal of the third transistor is connected with an output terminal of the shifting register, a first terminal of the third transistor is connected with the first potential output terminal, and a second terminal of the third transistor is connected with the first terminal of the first transistor, and a control terminal of the fourth transistor is connected with the output terminal of the shifting register, a first terminal of the fourth transistor is connected with the second potential output terminal, and a second terminal of the fourth transistor is connected with the second terminal of the second transistor.

According to some embodiments of the present disclosure, the corresponding pixel unit includes a light emitting diode, an anode of the light emitting diode is connected with the first terminal of the second transistor and the second terminal of the first transistor, and a cathode of the light emitting diode is grounded, in a case where the first potential signal is a high level signal being capable of turning on the light emitting diode, the second potential signal is a low level signal being capable of turning off the light emitting diode, the control signal of the corresponding control signal line is a high level signal being capable of turning on the first transistor and turning off the second transistor, and the output terminal of the shifting register has a high level signal being capable of turning on the third transistor and the fourth transistor, the light emitting diode is turned on, and in a case where the first potential signal is a high level signal being capable of turning on the light emitting diode, the second potential signal is a low level signal being capable of turning off the light emitting diode, the control signal of the corresponding control signal line is a low level signal being capable of turning off the first transistor and turning on the second transistor, and the output terminal of the shifting register has a high level signal being capable of turning on the third transistor and the fourth transistor, the light emitting diode is turned off.

According to some embodiments of the present disclosure, an amount of the potential saving units, an amount of the columns of the pixel driving units and an amount of the shifting registers are all the same.

According to some embodiments of the present disclosure, the display panel includes N rows and M columns of pixel units, where N and M are both positive integers; the driving circuit includes M potential saving units, M columns of pixel driving units and M shifting registers, each column of the pixel driving units is controlled by one potential saving unit and one shifting register, and there is a one-to-one correspondence between the pixel driving units and the pixel units.

According to some embodiments of the present disclosure, the potential saving unit includes:

a fifth transistor, including a control terminal connected with the external preset power supply and the first potential output terminal, and a first terminal which is grounded; and a sixth transistor, including a control terminal connected with a second terminal of the fifth transistor and the second potential output terminal, a first terminal connected with an internal preset power supply, and a second terminal connected with the control terminal of the fifth transistor.

According to some embodiments of the present disclosure, the potential saving unit further includes: a seventh transistor, including a first terminal connected with the external preset power supply, a second terminal connected with the control terminal of the fifth transistor and the first potential output terminal, and a control terminal connected with a power supply control signal line.

At least one embodiment of the present disclosure provides a display panel, which includes the above-mentioned driving circuit.

At least one embodiment of the present disclosure provides a display device, which includes the above-mentioned display panel.

BRIEF DESCRIPTION OF THE DRAWINGS

In order to clearly illustrate the technical solution of the embodiments of the invention, the drawings of the embodiments will be briefly described in the following. Evidently, the described drawings are only related to some embodiments of the invention and thus are not limitative of the invention. Based on the described embodiments herein, those skilled in the art can obtain other embodiment(s), without any inventive work, which should be within the scope of the disclosure.

DETAILED DESCRIPTION

Figure 1:
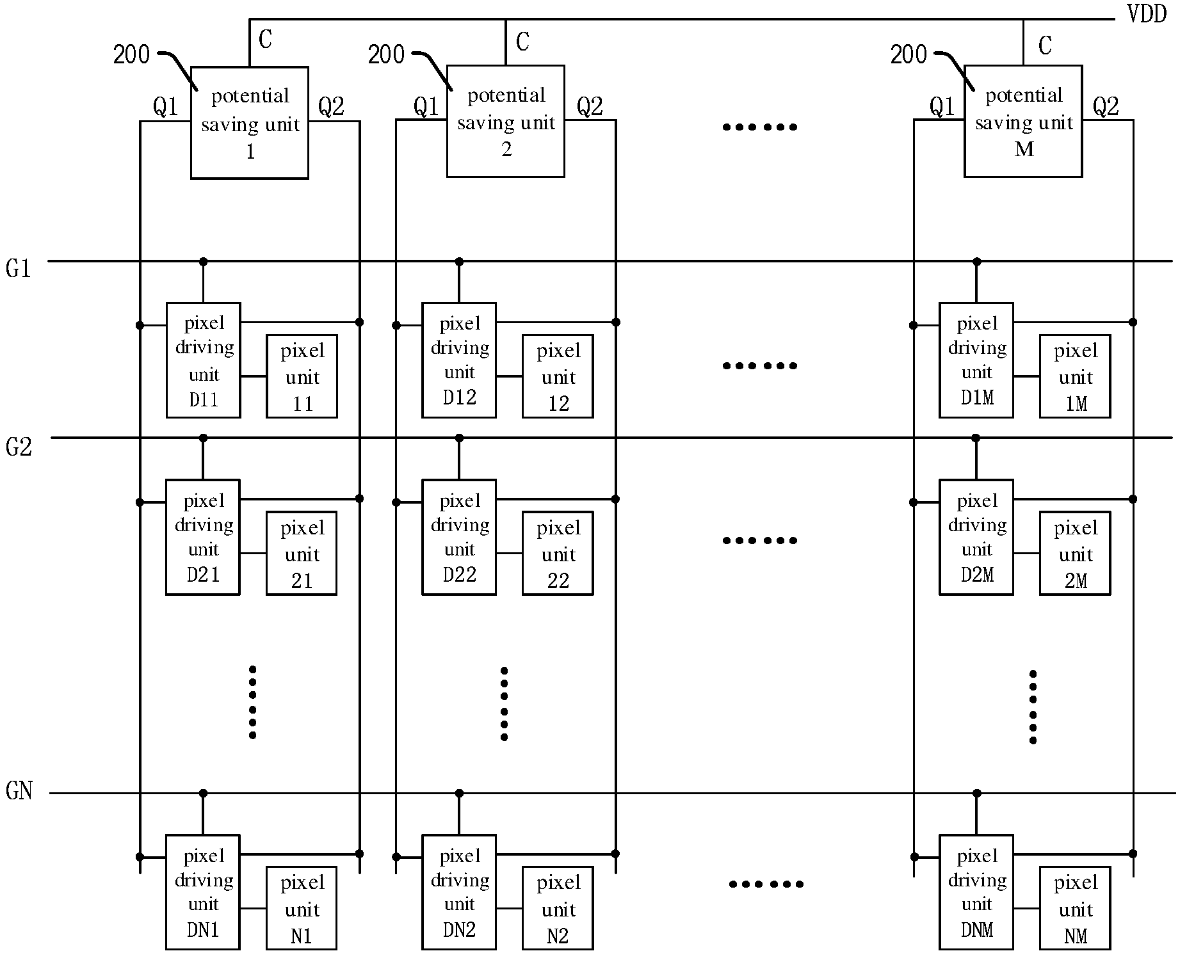
FIG. 1 is a structural schematic diagram of a driving circuit of a display panel according to an embodiment of the present disclosure.

The embodiments of the present disclosure are described in detail below, and the examples of the embodiments are illustrated in the drawings, wherein the same or similar reference numerals are used to refer to the same or similar elements or elements having the same or similar functions. The embodiments described below with reference to the accompanying drawings are intended to be illustrative, and are not to be construed as limiting.

The embodiments of the present disclosure provide a driving circuit of a display panel, a display panel and a display device. By adding a potential saving unit for each column of pixel units to provide a high voltage and a low voltage to each pixel unit, the pixel unit would be turned on or off as long as the high voltage or the low voltage is supplied to the corresponding pixel unit based on a control signal of a control signal line, without inputting complicated data voltage pulses, which effectively solves the problem of the high power consumption of the driving circuit caused by outputting complicated data voltage pulses, and greatly reduces the power consumption of the whole display panel.

Hereinafter, the driving circuit of the display panel, the display panel and the display device according to the embodiments of the present disclosure will be described with reference to accompanying drawings.

FIG. 1 is a structural schematic diagram of a driving circuit of a display panel according to an embodiment of the present disclosure.

In the embodiment of the present disclosure, a driving circuit of a display panel is provided, which includes at least one potential saving unit 200 and at least one column of pixel driving units.

The potential saving unit 200 is arranged corresponding to a column of pixel units. The potential saving unit 200 includes a power supply terminal C, a first potential output terminal Q1 and a second potential output terminal Q2, wherein the power supply terminal C is connected with an external preset power supply VDD , the potential saving unit 200 is configured to output a first potential signal based on a voltage of the external preset power supply VDD and save the first potential signal to the first potential output terminal Q1, while outputting a second potential signal and saving the second potential signal to the second potential output terminal Q2.

The at least one column of pixel driving units includes one or more pixel driving units, wherein each of the pixel driving units is connected with the first potential output terminal Q1, the second potential output terminal Q2, a corresponding control signal line G1, G2, . . . , GN and a corresponding pixel unit respectively, and each of the pixel driving units drives the corresponding pixel unit based on a control signal of the corresponding control signal line, the first potential signal and the second potential signal.

For example, the display panel includes N rows and M columns of pixel units, wherein N and M are both positive integers. As shown in FIG. 1, the N rows and M columns of pixel units include a pixel unit 11, a pixel unit 12, . . . a pixel unit 1M, . . . , a pixel unit N1, a pixel unit N2, . . . , a pixel unit NM. As shown in FIG. 1, the driving circuit of the display panel according to the embodiments of the present disclosure may include: a plurality of potential saving units and a plurality of columns of the pixel driving units. For example, the driving circuit includes M potential saving units, M columns of the pixel driving units and M shifting registers (referring to FIG. 2B). Each column of the pixel driving units is controlled by one potential saving unit and one shifting register. There is a one-to-one correspondence between the pixel driving units and the pixel units. The amount of potential saving units, the amount of columns of the pixel driving units and the amount of shifting registers are all the same (for example, M).

For example, M potential saving units are potential saving unit 1, potential saving unit 2, . . . , potential saving unit M respectively. Each of the M potential saving units is arranged corresponding to one column of pixel units. That is, each column of the pixel units is provided with one potential saving unit. Each potential saving unit includes a power supply terminal C, a first potential output terminal Q1 and a second potential output terminal Q2. The power supply terminal C is connected with a preset power supply VDD. Each potential saving unit is configured to output the first potential signal based on a voltage of the preset power supply VDD and save the first potential signal to the first potential output terminal Q1, while outputting the second potential signal and saving the second potential signal to the second potential output terminal Q2.

Each column of the M columns of the pixel driving units includes N pixel driving units, i.e., the driving circuit of the display panel includes N rows and M columns of pixel driving units. Each pixel unit corresponds to one pixel driving unit, and the N rows and M columns of pixel driving units are pixel driving unit D11, pixel driving unit D12, . . . , pixel driving unit D1M, . . . , pixel driving unit DN1, pixel driving unit DN2, . . . , pixel driving unit DNM, respectively. Each of the N pixel driving units of each column is connected with the first potential output terminal Q1 and the second potential output terminal Q2. In each column, each pixel driving unit is connected with its corresponding control signal line and pixel unit, wherein each pixel driving unit drives the corresponding pixel unit based on the control signal of the control signal line, the first potential signal and the second potential signal.

Specifically, as shown in FIG. 1, in the N-by-M matrix of the display panel, an input terminal of each column is connected with one potential saving unit. By the circuit of the potential saving unit, the first potential signal (such as a high level signal) is saved at the first potential output terminal Q1, and the second potential signal (such as a low level signal) is saved at the second potential output terminal Q2. The specific circuit structure will be described in detail below. In such a manner, when it is required to control a certain pixel unit to be ON/OFF, as long as the corresponding control signal is input to the pixel driving unit corresponding to this pixel unit, the ON/OFF control of the pixel unit is implemented by this pixel driving unit supplying the first potential signal (such as a high level signal) or the second potential signal (such as a low level signal) to the pixel unit.

For example, assuming that the first column of the pixel units needs to be controlled. At this point, an external controller may selectively turn on the first column of the pixel units by a column control signal line (not shown in the drawings), and then output the corresponding control signal to the row control signal lines G1, G2, . . . , GN based on the required display screen. The pixel driving unit transmits the first potential signal or the second potential signal to the light emitting diode in the pixel unit according to the high level signal/low level signal output by the control signal lines G1, G2, . . . , GN.

For example, when the row control signal line G1 outputs a high level signal, the pixel driving unit D11 transmits the first potential signal (such as a high level signal) to the anode (at this point, the cathode of the light emitting diode is grounded) of the light emitting diode in the pixel unit 11, the light emitting diode is turned on, and a white screen is displayed; when the row control signal line G1 outputs a low level signal, the pixel driving unit D11 transmits the second potential signal (such as a low level signal) to the anode (at this point, the cathode of the light emitting diode is grounded) of the light emitting diode in the pixel unit 11, the light emitting diode is turned off, and a black screen is displayed. Optionally, when the row control signal line G1 outputs a high level signal, the pixel driving unit D11 transmits the second potential signal (such as a low level signal) to the cathode (at this point, the anode of the light emitting diode is electrified) of the light emitting diode in the pixel unit 11, the light emitting diode is turned on, and a white screen is displayed; when the row control signal line G1 outputs a low level signal, the pixel driving unit D11 transmits the first potential signal (such as a high level signal) to the cathode (at this point, the anode of the light emitting diode is electrified) of the light emitting diode in the pixel unit 11, the light emitting diode is turned off, and a black screen is displayed. Therefore, the light emitting control on the display panel is implemented, without inputting complicated data voltage pulses.

It should be noted that when column scanning is performed on the pixel units, the column control signal line is connected with each column of the pixel driving units respectively. When a certain column of the pixel units needs to be selected, the high level signal is output to the column of the pixel driving units. Optionally, the column control signal line is connected with the potential saving unit for each column of pixel units respectively. When a certain column of the pixel units needs to be selected, the high level signal is output to the potential saving units for this column. At this point, the potential saving unit outputs the first potential signal, and saves the first potential signal to the first potential output terminal Q1, while outputting the second potential signal and saving the second potential signal to the second potential output terminal Q2. Although the column scanning could be implemented by these two ways, due to the arrangement of the column control signal lines, the control complexity of the external controller over the display panel is increased. Therefore, in the embodiments of the present disclosure, the column scanning may also be implemented by the shifting register. In this case, as long as the control signal is output to the control signal line based on the picture to be displayed, the control complexity is effectively reduced, which will be described in detail below.

In the driving circuit for the display panel according to the embodiments of the present disclosure, by adding one potential saving unit for each column of pixel units, each pixel unit is supplied with a high voltage and a low voltage. In this manner, the pixel unit would be turned on or off as long as the high voltage or the low voltage is supplied to the corresponding pixel unit based on a control signal of a control signal line, without inputting complicated data voltage pulses, which effectively solves the problem of the high power consumption of the driving circuit caused by outputting complicated data voltage pulses, and greatly reduces the power consumption of the whole display panel.

Figure 2A:
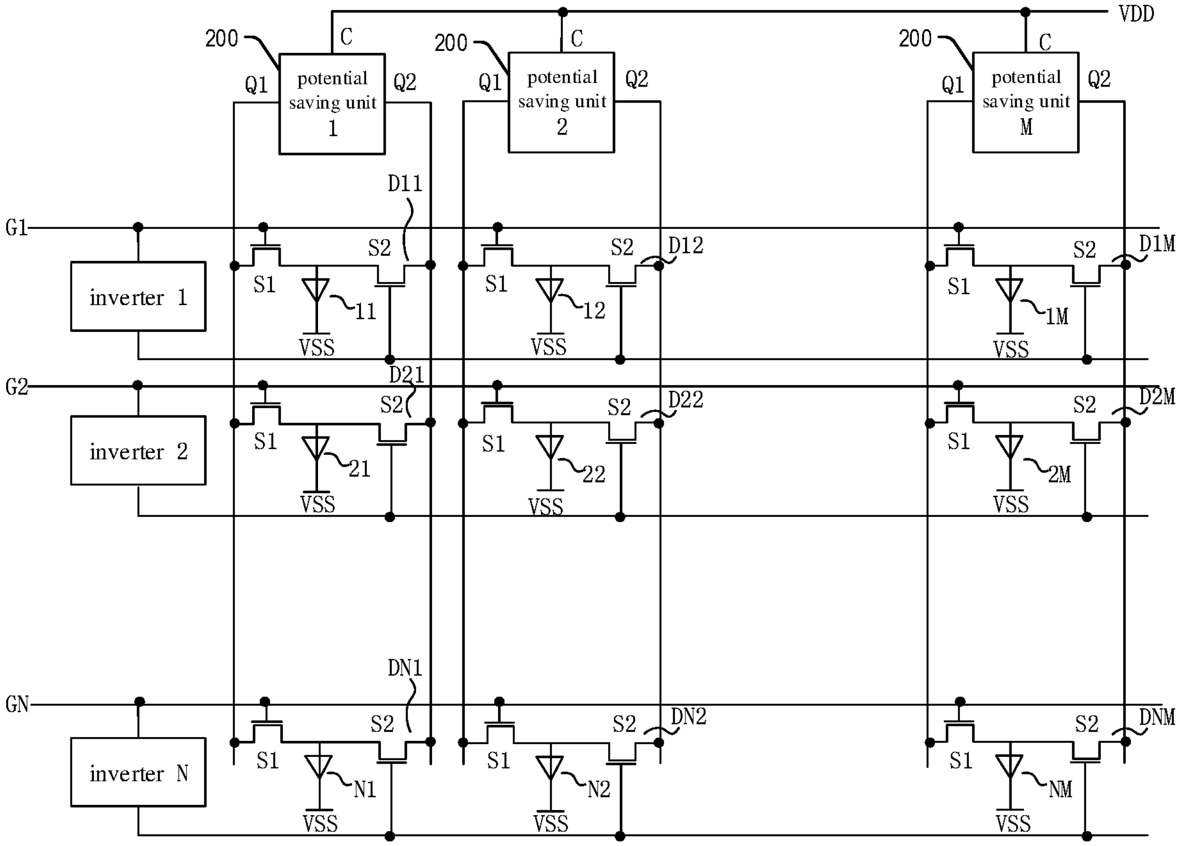
FIG. 2A is a structural schematic diagram of a driving circuit of a display panel according to another embodiment of the present disclosure.

According to one embodiment of the present disclosure, as shown in FIG. 2A, each pixel driving unit includes: a first transistor S1 and a second transistor S2. For example, the first terminal of the first transistor S1 is connected with the first potential output terminal Q1, the control terminal of the first transistor S1 is connected with the control signal line; the first terminal of the second transistor S2 is connected with the second terminal of the first transistor S1 and with the pixel unit, the second terminal of the second transistor S2 is connected with the second potential output terminal Q2, an the control terminal of the second transistor S2 is connected with the control signal line via the inverter. In the present disclosure, the description is made by taking the first transistor S1 and the second transistor S2 as N type transistors as an example. Certainly, the first transistor S1 and the second transistor S2 may also be P type transistors, which is not limited in the present disclosure.

Specifically, as shown in FIG. 2A, the line control signal lines G1, G2, . . . , GN are connected with the control terminals of the first transistors S1 in the corresponding rows of pixel driving units respectively, so as to directly output the control signal to each of the first transistors S1. Meanwhile, the row control signal lines G1, G2, . . . , GN are connected with the control terminals of the second transistors S2 in the corresponding rows of pixel driving units via inverter 1, inverter 2, . . . , inverter N, so as to output the control signal opposite to that of the first transistor S1 to the control terminal of the second transistor S2. In this way, when the row control signal line outputs the high level signal, the first transistor S1 is turned on, the second transistor S2 is turned off, and the pixel driving unit supplies the voltage of the first terminal of the first transistor S1 to the pixel unit; when the row control signal line outputs the low level signal, the first transistor S1 is turned off, the second transistor S2 is turned on, and the pixel driving unit supplies the voltage of the second terminal of the second transistor S2 to the pixel unit.

Since the first terminal of the first transistor S1 and the second terminal of the second transistor S2 are connected with the first potential output terminal Q1 and the second potential output terminal Q2 of the potential saving unit respectively, the first terminal of the first transistor S1 and the second terminal of the second transistor S2 obtain different voltage signals, and the pixel unit implements turning on and off of the pixel unit based on different voltage signals.

Figure 2B:
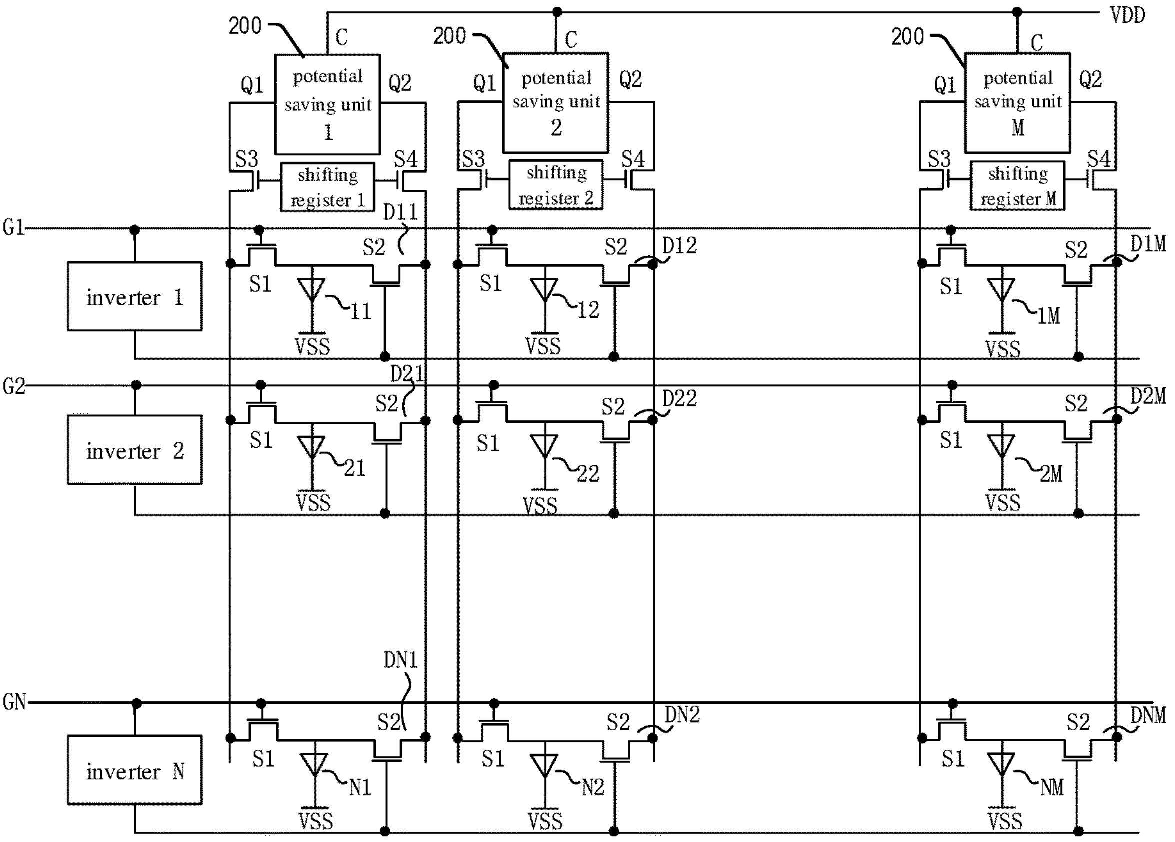
FIG. 2B is a structural schematic diagram of a driving circuit of a display panel according to yet another embodiment of the present disclosure.

Further, as shown in FIG. 2B, the above-mentioned driving circuit of the display panel may further include: M shifting registers (shifting register 1, shifting register 2, . . . , shifting register M respectively), and a third transistor S3 and a fourth transistor S4 which are connected with each of the M shifting registers correspondingly. For example, in each column of pixel units, the control terminal of the third transistor S3 is connected with the output terminal of the shifting register, the first terminal of the third transistor S3 is connected with the first potential output terminal Q1, the second terminal of the third transistor S3 is connected with the first terminal of each first transistor S1; the control terminal of the fourth transistor S4 is connected with the output terminal of the shifting register, the first terminal of the fourth transistor S4 is connected with the second potential output terminal Q2, and the second terminal of the fourth transistor S4 is connected with the second terminal of each second transistor S2. For example, the control terminal of the third transistor S3 and the control terminal of the fourth transistor S4 are connected with the same output terminal of the shifting register respectively. Further, as shown in FIGS. 2A and 2B, the pixel unit includes a light emitting diode, an anode of which is connected with the first terminal of the second transistor S2 and the second terminal of the first transistor S1 respectively, and a cathode of which is grounded, i.e. connected with VSS. When the first potential signal is a high level signal, the second potential signal is a low level signal, the control signal of the data control line is a high level signal, and the output terminal of the shifting register has a high level signal, the light emitting diode is turned on; when the first potential signal is a high level signal, the second potential signal is a low level signal, the control signal of the data control line is a low level signal, and the output terminal of the shifting register has a high level signal, the light emitting diode is turned off.

Specifically, as shown in FIG. 2B, in this embodiment, the column scanning of the pixel units is not implemented by the column control signal lines, but by the shifting registers. By the shifting registers giving the high level signal to the third transistor S3 and the fourth transistor S4 from left to right column by column, the third transistor S3 and the fourth transistor S4 are turned on, and the first potential signal of the first potential output terminal Q1 and the second potential signal of the second potential output terminal Q2 of the potential saving unit are transmitted to the pixel driving unit.

Specifically, as shown in FIG. 2B, assuming that the shifting register 1 outputs the high level signal to the control terminal of the third transistor S3 and the control terminal of the fourth transistor S4, the third transistor S3 and the fourth transistor S4 are turned on. At this point, the first terminal of the first transistor S1 obtains the first potential signal (such as a high level signal), and the second terminal of the second transistor S2 obtains the second potential signal (such as a low level signal). Based on the picture to be displayed, assuming that the picture displayed by the first column of pixel units is as follows: the pixel unit 11 and the pixel unit 21 display white pictures, and the pixel unit N1 displays a black picture, the row control signal lines G1 and G2 output the high level signal, and at this point, the first transistors S1 in the pixel driving units D1 and D21 are turned on, the second transistors S2 are turned off, the anodes of the light emitting diodes of the pixel units 11 and 21 obtain the first potential signal (such as a high level signal), and the light emitting diodes in the pixel units 11 and 21 are turned on to display the white pictures; meanwhile, the row control signal line GN outputs the low level signal, and at this point, the first transistor S1 of the pixel driving unit DN1 is turned off, the second transistor S2 is turned on, the anode of the light emitting diode in the pixel unit N1 obtains the second potential signal (such as a low level signal), and the light emitting diode in the pixel unit N1 is turned off to display a black picture.

Since the high level output of the shifting register 1 is an input of the shifting register, after the first column displays, the shifting register 2 in the second column outputs the high level signal. In the second column, the third transistor S3 and the fourth transistor S4 connected with the shifting register 2 are turned on, the potentials of the first output terminal Q1 and the second output terminal Q2 of the potential saving unit 2 are transmitted to the first terminal of the first transistor S1 and the second terminal of the second transistor S2, and the high or low levels of the row control signal lines G1, G2, . . . , GN are determined based on the picture to be displayed. Thus, the column scanning from left to right is implemented by the shifting registers. Every time one column is scanned, there is no need to input complicated data signals, it only needs to output the high level or the low level to the first transistor and the second transistor based on the picture to be displayed, so as to control the first transistor and the second transistor to be turned on or off, thereby supplying the high voltage or the low voltage to the corresponding pixel unit to turn on or off the pixel unit, wherein the high and low levels only need to enable the transistor to be turned on or off, without inputting strict voltage information.

Therefore, in the driving circuit of the display panel according to the embodiments of the present disclosure, column scanning is implemented by the shifting registers. Since the output of a shifting register is an input of a next shifting register, column scanning control lines are unnecessary, and complicated column control signals are omitted, which effectively eliminates the driving power consumption caused by column scanning and reduces the power consumption of the whole display panel. Meanwhile, by arranging the inverter additionally, the first transistor and the second transistor use the same control signal line, which effectively reduces the number of control signal lines and the complexity of the control signal.

The potential saving unit according to the present disclosure will be described below in conjunction with specific examples.

Figure 3A:
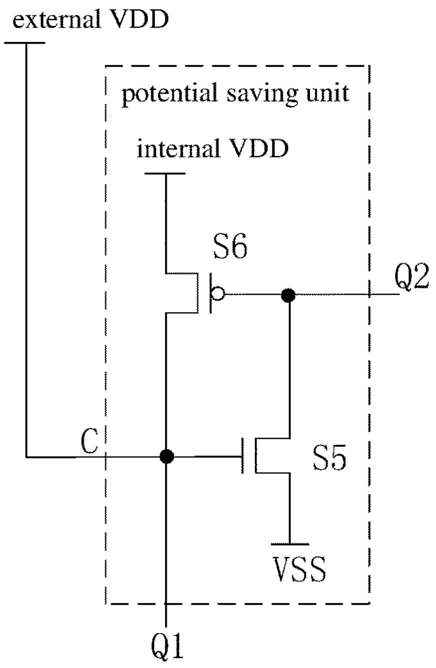
FIG. 3A is a circuit diagram of a potential saving unit according to one embodiment of the present disclosure.

According to an embodiment of the present disclosure, as shown in FIG. 3A, each potential saving unit may include: a fifth transistor S5 and a sixth transistor S6. For example, the control terminal of the fifth transistor S5 is connected with the external preset power supply VDD and the first potential output terminal Q1, the first terminal of the fifth transistor S5 is grounded, i.e., connected with VSS; the control terminal of the sixth transistor S6 is connected with the second terminal of the fifth transistor S5 and the second potential output terminal Q2, the first terminal of the sixth transistor S6 is connected with the internal present power supply VDD, and the second terminal of the sixth transistor S6 is connected with the control terminal of the fifth transistor S5.

It should be noted that in some embodiments, the external preset power supply and the internal preset power supply are different independent power supplies, arranged outside and inside the potential saving unit respectively. In other embodiments, the external preset power supply and the internal preset power supply may be implemented by a single power supply.

For example, the fifth transistor S5 is high-level effective (that is, N-type transistor which is turned on at the high level), and the sixth transistor S6 is low-level effective (that is, P-type transistor which is turned on at the low level). When the external preset power supply VDD is energized, the first potential output terminal Q1 outputs the first potential signal (the high level signal VDD). Meanwhile, the fifth transistor S5 is turned on, and the second potential output terminal Q2 outputs the second level signal (the low level signal VSS). Since the sixth transistor S6 is low-level effective, the sixth transistor S6 is turned on, and the first potential output terminal Q1 outputs the high level signal VDD at this point. If the external preset power supply of the potential saving unit is disconnected, since the control terminal of the fifth transistor S5 has the high level signal VDD, the fifth transistor S5 is always turned on, the second potential output terminal Q2 still outputs the second level signal (the low level signal VSS), and the sixth transistor S6 is still turned on with the low level signal, so the first potential output terminal Q1 still outputs the first potential signal (the high level signal VDD). Therefore, the potential saving unit attains outputting and saving of the potential signal.

It could be understood that according to the above-mentioned circuit analysis, the external preset power supply VDD of the potential saving unit may be disconnected after the potential saving unit is activated. That is, the external preset power supply VDD is equivalent to one starting signal. Therefore, in the embodiments of the present disclosure, one transistor may be additionally arranged between the power supply terminal C of the potential saving unit and the external preset power supply VDD, and the activation of the potential saving unit is controlled by the transistor.

Figure 3B:
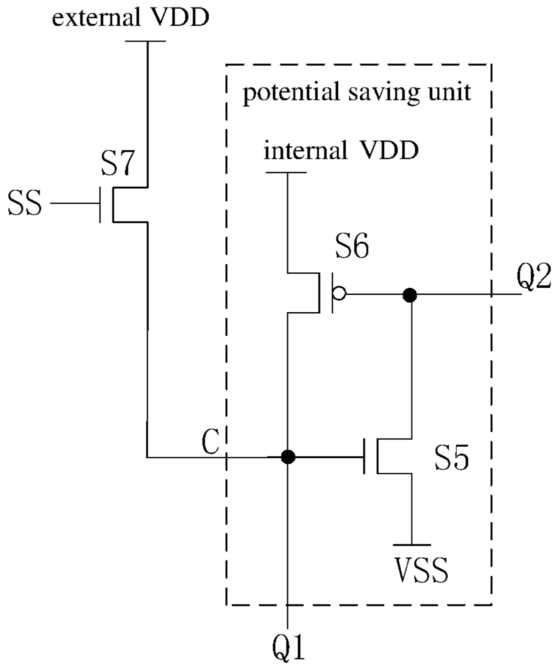
FIG. 3B is a circuit diagram of a potential saving unit according to another embodiment of the present disclosure.

Specifically, as shown in FIG. 3B, each potential saving unit may further include: a seventh transistor S7, a first terminal of which is connected with the external preset power supply VDD, a second terminal of which is connected with the control terminal of the fifth transistor S5 and the first potential output terminal Q1, and the control terminal of which is connected with the power supply control signal line SS.

Specifically, as shown in FIG. 3B, when the display panel is not required to display, the power supply control signal line SS has a low level signal, the seventh transistor S7 is turned off, and at this point, the power supply terminal C of the potential saving unit has no voltage, the potential saving unit is not activated, and there is no voltage signal at the first potential output terminal Q1 and the second potential output terminal Q2. When the display panel is required to display, the power supply control signal line SS has a high level signal, the voltage of the external preset power supply VDD is input to the power supply terminal C of the potential saving unit, the fifth transistor S5 and the sixth transistor S6 are turned on, the potential saving unit is activated, the second potential output terminal Q2 of the potential saving unit outputs the second potential signal (the low level signal VSS), and the first potential output terminal Q1 outputs the first potential signal (the high level signal VDD). Meanwhile, under the action of the fifth transistor S5 and the sixth transistor S6, even if the seventh transistor S7 is turned off again, the second potential output terminal Q2 still outputs the second level signal constantly (the low level signal VSS), and the first potential output terminal Q1 still outputs the first potential signal (the high level signal VDD) constantly. Thus, the activation control over the potential saving unit and potential saving after the potential saving unit is activated are achieved.

In the above-mentioned example, although the potential saving unit as shown in FIG. 3B has one more transistor than the potential saving unit as shown in FIG. 3A, with the control over the transistor, the potential saving unit is activated as required, thereby effectively reducing the working time and power consumption of the potential saving unit and thus reducing the power consumption of the display panel.

It could be understood that in the embodiments of the present disclosure, the external preset power supply VDD of the potential saving unit may be replaced with the low level signal VSS. In this case, the fifth transistor S5 in the potential saving unit is low-level effective, the sixth transistor S6 is high-level effective, the first terminal of the fifth transistor S5 is connected with the preset unit VDD, and the first terminal of the sixth transistor is grounded, i.e., connected with VSS, so as to achieve the activation control over the potential saving unit and potential saving after the potential saving unit is activated.

It should be noted that the circuit structures as shown in FIGS. 2A-2B are only exemplary in the present disclosure, and the specific circuit structure is not limited herein.

In sum, in the driving circuit of the display panel according to the embodiments of the present disclosure, by adding one circuit unit for saving potential for each column of pixel units to provide a high voltage and a low voltage to each pixel unit, the light emitting diode would be turned on or off as long as the high level or the low level is input to ensure the anode voltage/cathode voltage of the light emitting diode in the pixel unit, without inputting complicated data voltage pulses, which effectively solves the problem of the high power consumption of the driving circuit caused by outputting complicated data voltage pulses, and greatly reduces the power consumption of the whole display panel.

Figure 4:
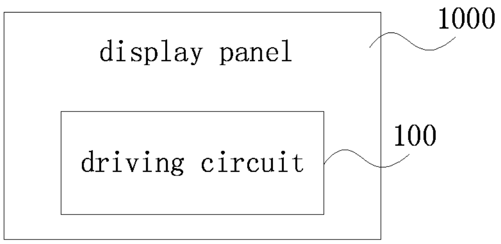
FIG. 4 is a schematic block diagram of a display panel according to some embodiments of the present disclosure.

FIG. 4 shows a schematic block diagram of a display panel according to some embodiments of the present disclosure. As shown in FIG. 4, the display panel 1000 according to the embodiments of the present disclosure includes the above-mentioned driving circuit 100.

In the display panel according to the embodiments of the present disclosure, with the above-mentioned driving circuit, the light emitting control over the display panel may be attained, without inputting complicated data voltage pulses, which effectively solves the problem of the high power consumption of the driving circuit caused by outputting complicated data voltage pulses, and greatly reduces the power consumption of the whole display panel.

Figure 5:
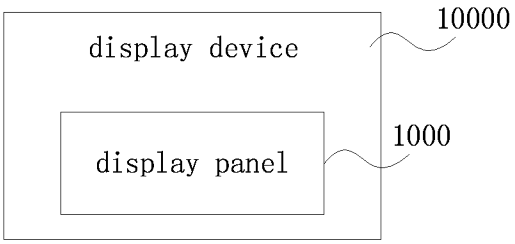
FIG. 5 is a schematic block diagram of a display device according to some embodiments of the present disclosure.

FIG. 5 is a schematic block diagram of a display device according to some embodiments of the present disclosure. As shown in FIG. 5, the display device 10000 according to the embodiments of the present disclosure includes the above-mentioned display panel 1000.

In the display device according to the embodiment of the present disclosure, with the above-mentioned display panel, the light emitting control may be attained, without inputting complicated data voltage pulses, which effectively solves the problem of the high power consumption of the driving circuit caused by outputting complicated data voltage pulses, and greatly reduces the power consumption of the whole display device.

In the present disclosure, it should be understood that the orientation or positional relationship indicated by the terms “center”, “longitudinal”, “transverse”, “length”, “width”, “thickness”, “on”, “under”, “front”, “back”, “left”, “right”, “vertical”, “horizontal”, “top”, “bottom”, “inside”, “outside”, “clockwise”, “counterclockwise”, “axial”, “radial”, “circumferential” and the like are based on the orientation or positional relationship shown in the drawings, and are merely for the convenience of describing the present disclosure and simplifying the description, and are not intended to indicate or imply that the indicated device or component must have a particular orientation and must be constructed and operated in a particular orientation, and should not be construed as limiting.

Moreover, the terms “first” and “second” are used for descriptive purposes only and are not to be construed as indicating or implying a relative importance or implicitly indicating the number of technical features indicated. Thus, features defined by “first” or “second” may include at least one of the features, either explicitly or implicitly. In the present disclosure, the meaning of “a plurality” is at least two, such as two, three, etc., unless specifically defined otherwise.

In the present disclosure, the terms “amounted”, “connected”, “connected”, “fixed”, and the like, should be construed broadly, and may indicate a fixed connection or a detachable connection, or integrated as a whole; may indicate a mechanical or electrical connection; may indicate being directly connected, or indirectly connected through an intermediate medium; may indicate an internal communication of two components or the interaction of two components, unless specifically defined otherwise. For those of ordinary skills in the art, the specific meanings of the above terms in the present disclosure can be understood on a case-by-case basis.

In the present disclosure, the first feature being “on” or “under” the second feature may be that the first and second features are in direct contact, or the first and second features are in indirect contact through an intermediate medium, unless otherwise explicitly stated and defined. Moreover, the first feature being “above” the second feature may be that the first feature is directly above the second feature, or merely that the first feature is higher than the second feature. The first feature being “below” the second feature may be that the first feature is directly below the second feature, or merely that the first feature level is lower than the second feature.

In the present disclosure, the description with reference to the terms “one embodiment,” “some embodiments,” “example,” “specific example,” or “some examples” and the like means a specific feature, structure, material, or characteristic described in connection with the embodiment or example is included in at least one embodiment or example of the present disclosure. In the present disclosure, the schematic expressions of the above terms are not necessarily directed to the same embodiment or example. Furthermore, the particular features, structures, materials, or characteristics described may be combined in a suitable manner in any one or more embodiments or examples. In addition, various embodiments or examples described in the present disclosure, as well as features of various embodiments or examples, may be combined on a non-conflicting basis.

While the embodiments of the present disclosure have been shown and described above, it should be understood that the above-described embodiments are illustrative and are not to be construed as limiting the scope of the disclosure. Variations, modifications, alterations and variations of the above-described embodiments may be made by those skilled in the art within the scope of the present disclosure. The protection scope of the disclosure should be determined by the scope of the appended claims.

What is claimed is:

1. A driving circuit of a display panel, comprising:

at least one potential saving unit, arranged corresponding to a column of pixel units, wherein the potential saving unit comprises a power supply terminal, a first potential output terminal and a second potential output terminal, the power supply terminal is connected with an external preset power supply, and the potential saving unit is configured to output a first potential signal based on a voltage of the external preset power supply and save the first potential signal to the first potential output terminal, while outputting a second potential signal and saving the second potential signal to the second potential output terminal; and at least one column of pixel driving units, comprising one or more pixel driving units, wherein each of the pixel driving units is connected with the first potential output terminal, the second potential output terminal, a corresponding control signal line and a corresponding pixel unit, and each of the pixel driving units drives the corresponding pixel unit based on a control signal of the corresponding control signal line, the first potential signal and the second potential signal.

2. The driving circuit according to claim 1, wherein each of the pixel driving units comprises:

a first transistor, comprising a first terminal connected with the first potential output terminal and a control terminal connected with the corresponding control signal line; and a second transistor, comprising a first terminal connected with a second terminal of the first transistor and the corresponding pixel unit, a second pole connected with the second potential output terminal, and a control terminal connected with the corresponding control signal line via an inverter.

3. The driving circuit according to claim 2, further comprising: at least one shifting register, a third transistor and a fourth transistor, both the third transistor and the fourth transistor being connected with the shifting register, wherein a control terminal of the third transistor is connected with an output terminal of the shifting register, a first terminal of the third transistor is connected with the first potential output terminal, and a second terminal of the third transistor is connected with the first terminal of the first transistor; and a control terminal of the fourth transistor is connected with the output terminal of the shifting register, a first terminal of the fourth transistor is connected with the second potential output terminal, and a second terminal of the fourth transistor is connected with the second terminal of the second transistor.

4. The driving circuit according to claim 3, wherein the corresponding pixel unit comprises a light emitting diode, an anode of the light emitting diode is connected with the first terminal of the second transistor and the second terminal of the first transistor, and a cathode of the light emitting diode is grounded, in a case where the first potential signal is a high level signal being capable of turning on the light emitting diode, the second potential signal is a low level signal being capable of turning off the light emitting diode, the control signal of the corresponding control signal line is a high level signal being capable of turning on the first transistor and turning off the second transistor, and the output terminal of the shifting register has a high level signal being capable of turning on the third transistor and the fourth transistor, the light emitting diode is turned on, and in a case where the first potential signal is a high level signal being capable of turning on the light emitting diode, the second potential signal is a low level signal being capable of turning off the light emitting diode, the control signal of the corresponding control signal line is a low level signal being capable of turning off the first transistor and turning on the second transistor, and the output terminal of the shifting register has a high level signal being capable of turning on the third transistor and the fourth transistor, the light emitting diode is turned off.

5. The driving circuit according to claim 1, wherein an amount of the potential saving units, an amount of the columns of the pixel driving units and an amount of the shifting registers are all the same.

6. The driving circuit according to claim 5, wherein the display panel comprises N rows and M columns of pixel units, where N and M are positive integers; the driving circuit comprises M potential saving units, M columns of pixel driving units and M shifting registers, each column of the pixel driving units is controlled by one potential saving unit and one shifting register, and there is a one-to-one correspondence between the pixel driving units and the pixel units.

7. The driving circuit according to claim 1, wherein the potential saving unit comprises:

a fifth transistor, comprising a control terminal connected with the external preset power supply and the first potential output terminal, and a first terminal which is grounded; and a sixth transistor, comprising a control terminal connected with a second terminal of the fifth transistor and the second potential output terminal, a first terminal connected with an internal preset power supply, and a second terminal connected with the control terminal of the fifth transistor.

8. The driving circuit according to claim 7, wherein the potential saving unit further comprises:

a seventh transistor, comprising a first terminal connected with the external preset power supply, a second terminal connected with the control terminal of the fifth transistor and the first potential output terminal, and a control terminal connected with a power supply control signal line.

9. A display panel, comprising a driving circuit, the driving circuit comprising:

at least one potential saving unit, arranged corresponding to a column of pixel units, wherein the potential saving unit comprises a power supply terminal, a first potential output terminal and a second potential output terminal, the power supply terminal is connected with an external preset power supply, and the potential saving unit is configured to output a first potential signal based on a voltage of the external preset power supply and save the first potential signal to the first potential output terminal, while outputting a second potential signal and saving the second potential signal to the second potential output terminal; and at least one column of pixel driving units, comprising one or more pixel driving units, wherein each of the pixel driving units is connected with the first potential output terminal, the second potential output terminal, a corresponding control signal line and a corresponding pixel unit, and each of the pixel driving units drives the corresponding pixel unit based on a control signal of the corresponding control signal line, the first potential signal and the second potential signal.

10. A display device, comprising a display panel, the display panel comprising a driving circuit, the driving circuit comprising:

at least one potential saving unit, arranged corresponding to a column of pixel units, wherein the potential saving unit comprises a power supply terminal, a first potential output terminal and a second potential output terminal, the power supply terminal is connected with an external preset power supply, and the potential saving unit is configured to output a first potential signal based on a voltage of the external preset power supply and save the first potential signal to the first potential output terminal, while outputting a second potential signal and saving the second potential signal to the second potential output terminal; and at least one column of pixel driving units, comprising one or more pixel driving units, wherein each of the pixel driving units is connected with the first potential output terminal, the second potential output terminal a corresponding control signal line and a corresponding pixel unit, and each of the pixel driving units drives the corresponding pixel unit based on a control signal of the corresponding control signal line, the first potential signal and the second potential signal.

11. The driving circuit according to claim 2, wherein an amount of the potential saving units, an amount of the columns of the pixel driving units and an amount of the shifting registers are all the same.

12. The driving circuit according to claim 3, wherein an amount of the potential saving units, an amount of the columns of the pixel driving units and an amount of the shifting registers are all the same.

13. The driving circuit according to claim 4, wherein an amount of the potential saving units, an amount of the columns of the pixel driving units and an amount of the shifting registers are all the same.

14. The driving circuit according to claim 2, wherein the potential saving unit comprises:

a fifth transistor, comprising a control terminal connected with the external preset power supply and the first potential output terminal, and a first terminal which is grounded; and a sixth transistor, comprising a control terminal connected with a second terminal of the fifth transistor and the second potential output terminal, a first terminal connected with an internal preset power supply, and a second terminal connected with the control terminal of the fifth transistor.

15. The driving circuit according to claim 3, wherein the potential saving unit comprises:

a fifth transistor, comprising a control terminal connected with the external preset power supply and the first potential output terminal, and a first terminal which is grounded; and a sixth transistor, comprising a control terminal connected with a second terminal of the fifth transistor and the second potential output terminal, a first terminal connected with an internal preset power supply, and a second terminal connected with the control terminal of the fifth transistor.

16. The driving circuit according to claim 4, wherein the potential saving unit comprises:

a fifth transistor, comprising a control terminal connected with the external preset power supply and the first potential output terminal, and a first terminal which is grounded; and a sixth transistor, comprising a control terminal connected with a second terminal of the fifth transistor and the second potential output terminal, a first terminal connected with an internal preset power supply, and a second terminal connected with the control terminal of the fifth transistor.

17. The display panel according to claim 9, wherein each of the pixel driving units comprises:

a first transistor, comprising a first terminal connected with the first potential output terminal and a control terminal connected with the corresponding control signal line; and a second transistor, comprising a first terminal connected with a second terminal of the first transistor and the corresponding pixel unit, a second pole connected with the second potential output terminal, and a control terminal connected with the corresponding control signal line via an inverter.

18. The display panel according to claim 17, wherein the driving circuit further comprises: at least one shifting register, a third transistor and a fourth transistor, both the third transistor and the fourth transistor being connected with the shifting register, wherein a control terminal of the third transistor is connected with an output terminal of the shifting register, a first terminal of the third transistor is connected with the first potential output terminal, and a second terminal of the third transistor is connected with the first terminal of the first transistor; and a control terminal of the fourth transistor is connected with the output terminal of the shifting register, a first terminal of the fourth transistor is connected with the second potential output terminal, and a second terminal of the fourth transistor is connected with the second terminal of the second transistor.

19. The display panel according to claim 18, wherein the corresponding pixel unit comprises a light emitting diode, an anode of the light emitting diode is connected with the first terminal of the second transistor and the second terminal of the first transistor, and a cathode of the light emitting diode is grounded, in a case where the first potential signal is a high level signal being capable of turning on the light emitting diode, the second potential signal is a low level signal being capable of turning off the light emitting diode, the control signal of the corresponding control signal line is a high level signal being capable of turning on the first transistor, and the output terminal of the shifting register has a high level signal being capable of turning on the third transistor and the fourth transistor, the light emitting diode is turned on, and in a case where the first potential signal is a high level signal being capable of turning on the light emitting diode, the second potential signal is a low level signal being capable of turning off the light emitting diode, the control signal of the corresponding control signal line is a low level signal being capable of turning off the first transistor, and the output terminal of the shifting register has a high level signal being capable of turning on the third transistor and the fourth transistor, the light emitting diode is turned off.

20. The display panel according to claim 9, wherein an amount of the potential saving units, an amount of the columns of the pixel driving units and an amount of the shifting registers are all the same.

* * * * *